(12) United States Patent
Napolitano

(10) Patent No.: US 6,168,565 B1
(45) Date of Patent: Jan. 2, 2001

(54) MEDICAL DIAGNOSTIC ULTRASOUND SYSTEM AND METHOD FOR SIMULTANEOUS PHASE CORRECTION OF TWO FREQUENCY BAND SIGNAL COMPONENTS

(75) Inventor: David J. Napolitano, Pleasanton, CA (US)

(73) Assignee: Acuson Corporation, Mountain View, CA (US)

( * ) Notice: Under 35 U.S.C. 154(b), the term of this patent shall be extended for 0 days.

(21) Appl. No.: 09/282,511

(22) Filed: Mar. 31, 1999

(51) Int. Cl.$^7$ .................................................... A61B 8/00
(52) U.S. Cl. ............................................................ 600/447
(58) Field of Search .................................... 600/443, 447; 73/629, 625, 626; 367/87, 138, 7

(56) References Cited

U.S. PATENT DOCUMENTS

| | | | |
|---|---|---|---|
| 4,140,022 | * 2/1979 | Maslak | 73/626 |
| 4,852,577 | * 8/1989 | Smith et al. | 600/443 |
| 4,886,069 | 12/1989 | O'Donnell . | |
| 5,172,343 | * 12/1992 | O'Donnell | 367/7 |
| 5,331,964 | * 7/1994 | Trahey et al. | 600/447 |
| 5,423,318 | * 6/1995 | Li et al. | 600/447 |
| 5,456,257 | 10/1995 | Johnson et al. . | |
| 5,605,154 | * 2/1997 | Ries et al. | 600/444 |
| 5,632,277 | 5/1997 | Chapman et al. . | |
| 5,667,373 | 9/1997 | Wright et al. . | |
| 5,675,554 | 10/1997 | Cole et al. . | |
| 5,685,308 | 11/1997 | Wright et al. . | |
| 5,706,819 | 1/1998 | Hwang et al. . | |
| 5,740,128 | 4/1998 | Hossack et al. . | |
| 5,793,701 | * 8/1998 | Wright et al. | 367/7 |
| 5,833,613 | 11/1998 | Averkiou et al. . | |
| 5,879,303 | 3/1999 | Averkiou et al. . | |
| 5,891,038 | * 4/1999 | Seyed-Bolorforosh et al. | 600/447 |
| 6,027,447 | * 2/2000 | Li | 600/447 |

* cited by examiner

Primary Examiner—Marvin M. Lateef
Assistant Examiner—Ali M. Imam
(74) Attorney, Agent, or Firm—Craig A. Summerfield; Brinks Hofer Gilson & Lione

(57) ABSTRACT

A medical diagnostic ultrasound method and system for simultaneous phase correction of signal components at two frequency bands is provided. Simultaneous phase correction is performed, in part, during transmission of ultrasound waveforms and, in part, during reception of returning echoes. The phase between any two transmitted beams is adjusted by a first phase value. The phase between any two received beams is adjusted by a second phase value. Selection of the first and second phase values allows for simultaneous correction of signal components at two different frequency bands. For example, fundamental and second harmonic frequency bands are corrected for coherent imaging or processing. The phase corrections may account for different transmit and receive processes, such as fixed focus transmission and dynamic receive focusing. Images responsive to harmonic and fundamental frequencies may be generated from the same transmit and receive process with the benefits of coherent imaging, including increased frame rate.

19 Claims, 3 Drawing Sheets

SIGNAL SPECTRUM

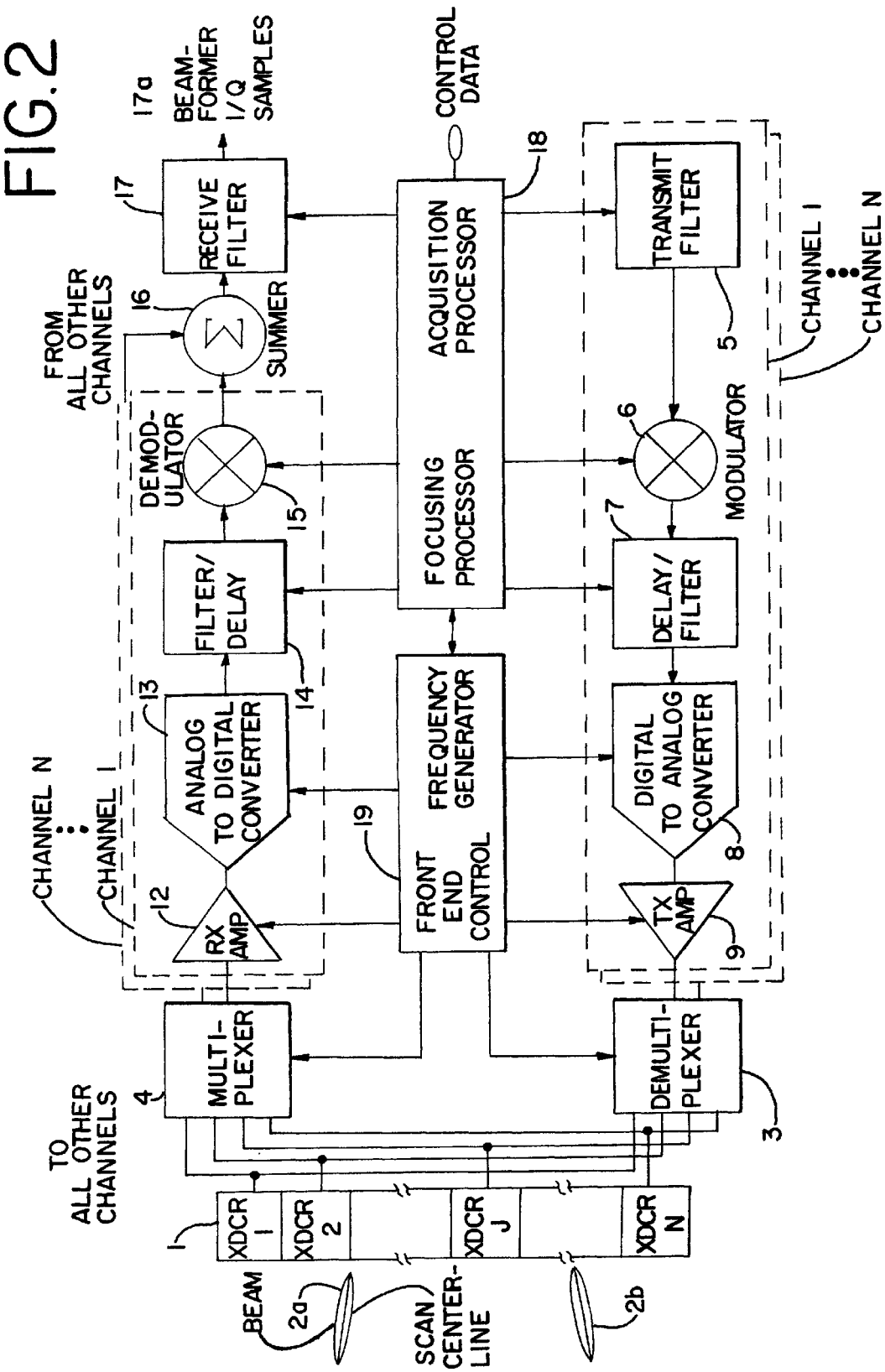

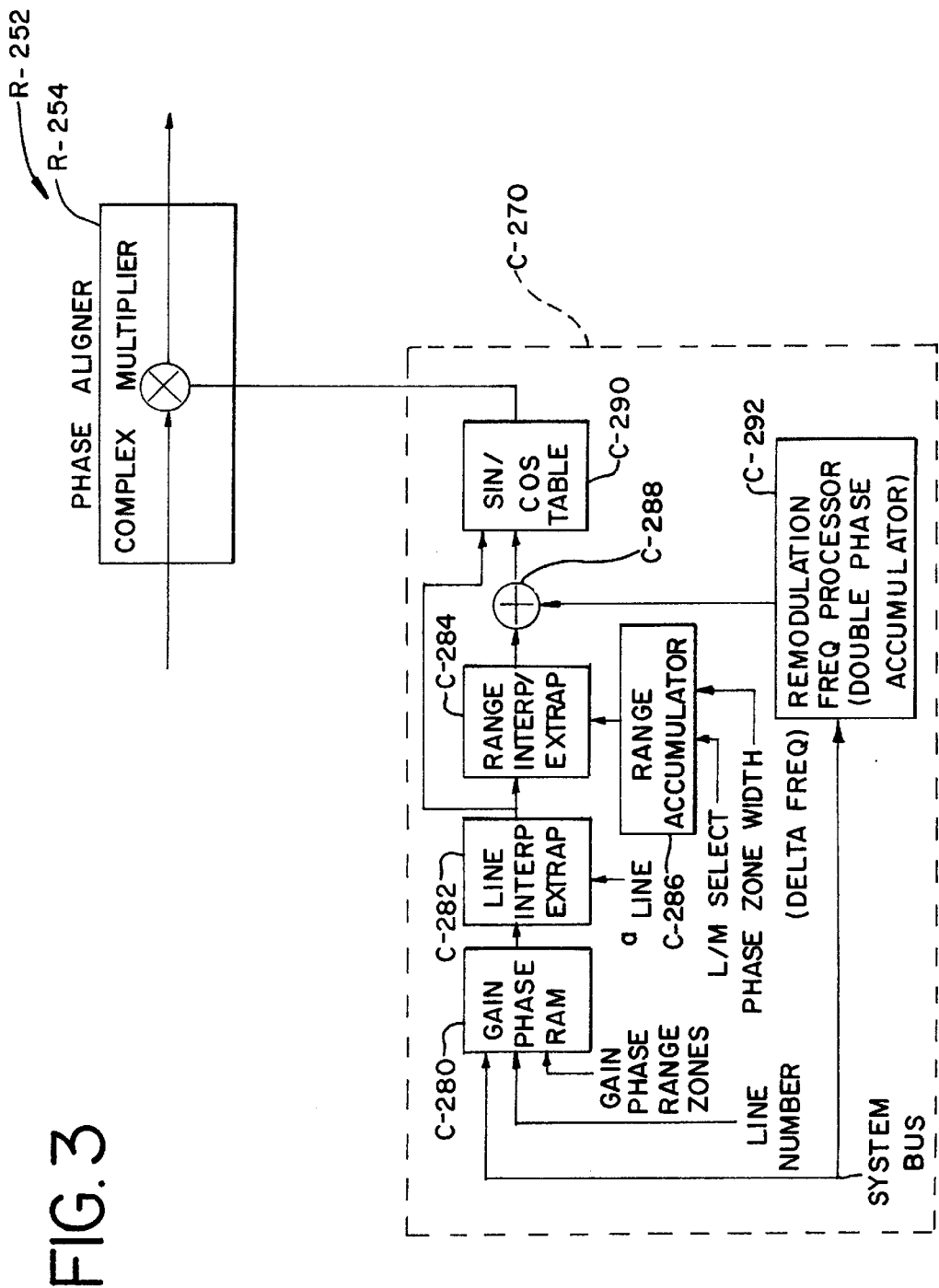

MEDICAL DIAGNOSTIC ULTRASOUND SYSTEM AND METHOD FOR SIMULTANEOUS PHASE CORRECTION OF TWO FREQUENCY BAND SIGNAL COMPONENTS

BACKGROUND

This invention relates to a medical diagnostic ultrasound system and method for simultaneous phase correction of signal components at two frequency bands. In particular, phase corrections of two different frequency bands for coherent image formation is provided.

Coherent image formation is performed by tracking and maintaining a phase relationship between data associated with different scan lines. Coherent imaging allows for phase alignment operations on data as a function of range across each scan line. This phase alignment allows for faster frame rates by creation of synthetic data without degradation in image quality due to azimuthal under-sampling artifacts and beam distortions.

Methods and systems for coherent imaging are described in U.S. Pat. No. 5,667,373. In one embodiment, a range and scan line dependent phase shifter or phase aligner is used to align data. The phase shifter operates as part of the receive beamformer on data representing receive beams. The phase between data samples is adjusted as a function of range based on dynamic transmit focusing (see U.S. Pat. No. 5,740,128). The phase shifter operates at one frequency band and/or remodulates data from different transmit frequency bands to provide data for each scan line as though a common carrier frequency had been used.

BRIEF SUMMARY

The present invention is defined by the following claims, and nothing in this section should be taken as a limitation on those claims. By way of introduction, the preferred embodiment described below includes a medical diagnostic ultrasound method and system for simultaneous phase correction of signal components at two frequency bands. In one embodiment, fundamental and second harmonic frequency bands are corrected for coherent imaging or processing. Images or data responsive to harmonic and fundamental frequencies may be generated from the same transmit and receive process with the benefits of coherent imaging, including increased frame rate.

In one embodiment, simultaneous phase correction is performed, in part, during transmission of ultrasound waveforms and, in part, during reception of returning echoes. The phase between any two transmitted beams is adjusted by a first phase value. The phase between any two received beams is adjusted by a second phase value. Selection of the first and second phase values allows for simultaneous correction of signal components at two different frequency bands. The phase corrections may account for different transmit and receive processes, such as fixed focus transmission and dynamic receive focusing.

In a first aspect, a medical diagnostic ultrasound method and system for phase correction of signal components is provided. A transmit beamformer adjusts a first phase of a first transmit beam by a first correction factor. A receive beamformer adjusts a second phase of data representing at least part of a first receive beam by a second correction factor. The first receive beam is responsive to the first transmit beam.

In a second aspect, an improvement in a medical diagnostic ultrasound method comprising the steps of (a) transmitting at least two transmit beams, (b) receiving samples along at least two receive beams responsive to the at least two transmit beams, and (c) establishing a coherent relationship between at least two of the samples, each of the at least two samples associated with a different one of the at least two receive beams, is provided. The improvement comprises simultaneously adjusting a phase between the at least two of the samples for harmonic and fundamental frequency bands.

Further aspects and advantages are discussed below in conjunction with the preferred embodiments.

BRIEF DESCRIPTION OF SEVERAL VIEWS OF THE DRAWINGS

FIG. 2 is a schematic block diagram of beamformer system of a medical diagnostic ultrasound system for phase correction.

FIG. 3 is a schematic block diagram of a phase aligner.

DETAILED DESCRIPTION OF THE MENTION

Coherent image or data formation with phase adjustment for transmit and receive operations allows simultaneous adjustment for acquisition of useful data in different frequency bands. As used herein, simultaneous adjustment includes adjusting signal components in different frequency bands, including where the adjustment is made to both frequency bands at two different times. For example, performing one phase adjustment during transmission of beams and another during reception of beams comprises simultaneous adjustment for the two frequency bands. Both phase adjustments contribute to the phase adjustment for each frequency band.

Generally, coherent image or data formation offers increased image information and frame rate for ultrasound imaging. These advantages exist either for linearly generated echoes at fundamental frequencies, or non-linearly generated echoes at harmonic frequencies. These advantages are accomplished by performing beam to beam algebraic operations, such as interpolation to generate synthetic data. For these algebraic operations, range samples for each receive beam are phase aligned (i.e. the phase relationship between beams is corrected).

Various scan geometries of a region (e.g. curved linear) and diffraction effects introduce beam to beam phase distortions or errors. Range and azimuth (i.e. across scan lines or beams) dependent phase adjustment of received samples is used before beam to beam processing in order to eliminate image artifacts. The data representing the beams may be obtained simultaneously or sequentially.

Ultrasound systems typically operate with broadband pulses (e.g. pulse wave operation). A phase adjustment between data compensates for a limited range of frequencies due to the two-way pulse arrival time that is range and line dependent due to scan geometry, aperture positioning and other factors. If only one of the fundamental or harmonic signal components is of interest, one phase adjustment provides sufficiently accurate correction over the range or band of frequencies.

Figure 1:
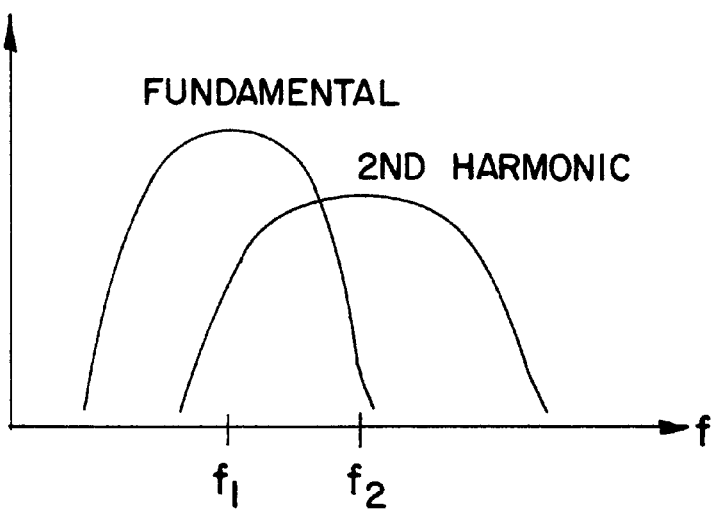
FIG. 1 is a graphical representation of a signal spectrum for coherent imaging.

In some applications, the range or band of frequencies for processing or imaging may be large, such as imaging with both fundamental and harmonic band frequency signal components. For example, a received signal contains both fundamental and second harmonic frequency components of interest. FIG. 1 shows the frequency spectrum of such a signal. Separate signals responsive to each frequency band are isolated and used for processing or imaging separately or in combination.

For phase corrections of two different frequency bands, assume that the amount of delay error, $\Delta\tau$, between beams introduced by image scan geometry and diffraction effects amounts to a full cycle at the center frequency, $f_2$, of the harmonic frequency band (i.e., $\Delta\tau=1f_2$). Other delay error values may be used. Assuming that the second harmonic center frequency $f_2$ is approximately equal to $2f_1$ (i.e. two multiplied by the center frequency of the fundamental frequency band), the phase errors $\Delta\Phi_1$ and $\Delta\Phi_2$ between receive beams at the fundamental and second harmonic center frequencies, respectively, are given by Fundamental: $\Delta\Phi_1=2\pi f_1\Delta\tau=2\pi f_1/f_2=\pi$ (1)

Second Harmonic: $\Delta\Phi_2=2\pi f_2\Delta\tau=2\pi f_2/f_2=2\pi$

The equations at group (1) demonstrate the phase relationship between samples at a same range of different beams as a function of frequency.

Phase correction performed only as part of receive processing provides for phase correction for one frequency band. In order to perform phase correction at the second harmonic frequency $f_2$, a phase shift of $-2\pi$, or $-360$ degrees is applied between received samples. In order to perform phase correction at the fundamental frequency $f_1$, a phase shift of $-\pi$, or $-180$ degrees is applied between received samples. If only one of fundamental or second harmonic frequencies are of interest, the phase errors at the other frequency are unimportant. However, when both fundamental and second harmonic frequency components are of interest, applying a phase correction of $-360$ degrees at the second harmonic center frequency introduces a $-180$ degree error at the fundamental center frequency. Likewise, applying a phase correction of $-180$ degrees at the fundamental center frequency leaves an error of $-180$ degrees at the second harmonic center frequency.

Phase correction of signal components at both the fundamental and harmonic frequency bands is performed by correcting the phase as part of the receive operation as described above and as part of transmit operations. Other harmonics, including higher order harmonics (e.g. second, third or fourth), sub-harmonics (e.g. ½) and fractional harmonics (e.g. 3⁄2) may comprise the harmonic frequency band. Simultaneous phase correction may also be performed where two non-linearly generated harmonic components of different orders are of interest and the fundamental is not of interest.

Simultaneous phase correction of signal components at two frequency bands is accomplished by taking advantage of each signal component's different transmit behavior. In one example, the fundamental and second harmonic frequency components are of interest. Any phase adjustment introduced to the transmit waveforms is preserved in the fundamental component of the receive signal and doubled in the second harmonic component due to the square-law nature of the second harmonic signal. This relative phase scaling also occurs on any beam to beam phase adjustments. Based on these characteristics, the phase correction is represented by the following equations:

Fundamental: $\Delta\Phi_x+\Delta\Phi_r+\Delta\Phi_1=0$ (2)

Second Harmonic: $2\Delta\Phi_x+\Delta\Phi_r+\Delta\Phi_2=0$ where $\Delta\Phi_1$ and $\Delta\Phi_2$ are the phase errors between beams at the center frequencies $f_1$ and $f_2$ respectively, and $\Delta\Phi_x$ and $\Delta\Phi_r$ are the beam to beam phase adjustments or correction factors applied on transmit and receive beams, respectively.

Equations (2) are solved for $\Delta\Phi_x$ and $\Delta\Phi_r$ to determine the phase adjustments for coherently imaging or processing with signal components from two different frequency bands. If both signal components of interest were linear (i.e. both components at the fundamental frequency) or non-linear with the same harmonic order (e.g. both components at the second harmonic frequency), these equations (2) would be linearly dependent and would not have a unique solution. Solving for $\Delta\Phi_x$ and $\Delta\Phi_r$ produces $\Delta\Phi_x=(\Delta\Phi_2-\Delta\Phi_1)$ (3)

$\Delta\Phi_r=-\Delta\Phi_2+2(\Delta\Phi_2-\Delta\Phi_1)$

Defining the phase correction values as $\Delta\Phi_{2c}=-\Delta\Phi_2$ and $\Delta\Phi_{1c}=-\Delta\Phi_1$, then $\Delta\Phi_x=(\Delta\Phi_{2c}-\Delta\Phi_{1c})$ (4)

$\Delta\Phi_r=\Delta\Phi_{2c}-2\Delta\Phi_x$

If only the second harmonic frequencies are of interest and only a phase adjustment on receive is applied, then $\Delta\Phi_x=0$ and $\Delta\Phi_r=\Delta\Phi_{2c}=-\Delta\Phi_2$, which is the beam to beam receive phase correction value previously discussed for phase correction during receive processing.

Using the equations at group (4), transmit and receive phase corrections are selected given the different phase errors at the fundamental and second harmonic center frequencies. Similar equations may be derived for other frequency bands of interest. The transmit and receive correction factors are applied to simultaneously adjust the phase relationship of data for two frequency bands. This process is repeated for range samples of multiple beams of an entire scan of a region.

Any one of various beamformers for coherent imaging may be used for implementing the phase corrections discussed herein. For example and referring to FIG. 2, one embodiment of a preferred beamformer system is schematically represented. This system is also disclosed in U.S. Pat. Nos. 5,667,373 (the '373 patent), 5,685,308, and 5,675,554, the disclosures of which are incorporated herein by reference. Other systems that acquire coherent representations of signals along each receive beam using analog or digital beamformers may be used, such as the beamformer system disclosed in U.S. Pat. No. 4,886,069, beamformers disclosed in the patents listed at column 21 of the above referenced '373 patent, and other systems described in the '373 patent.

In the embodiment represented by FIG. 2, digital transmit and receive beamformers are used. The transmit beamformer comprises transmit filters 5, modulators 6, delay/filters 7, digital to analog converters 8 and transmit amplifiers 9 in a plurality of channels, N. The transmit beamformer also includes a de-multiplexer 3 connected between the channels and a transducer 1. The receive beamformer is connected to the transducer 1 through a multiplexer 4. The receive beamformer further comprises receive amplifiers 12, analog to digital converters 13, filter/delays 14 and demodulators 15 in a plurality of channels, N. The receive beamformer also includes a summer 16 and a receive filter 17 connected to the N receive channels. Control blocks or processors 18 and 19 connect to various components of the receive and transmit beamformers for controlling beam formation.

The transducer array 1 of FIG. 2 comprises a plurality of elements XDCR 1 to XDCR N that might be 128 or more in number. Fewer elements may be used.

The transmit filter 5 is programmed to represent the complex envelope of the pulse to be transmitted. The digital modulator 6 up-converts the complex envelope to the transmit frequency and provides the appropriate phasing and apodization. The delay/filter 7 provides the bulk of the delay for focusing and filtering for suppression of spurious responses. The delay/filter 7 and/or digital modulator 6 also adjusts the phase as appropriate for each waveform generated for each transmit beam. The phase is adjusted as a function of the correction factor discussed herein, such as determining intermediate sums across lines such that the desired line to line phase correction is provided. In alternative embodiments, the phase is adjusted by applying different delays or combinations of delays and phasing. One of delays, phasing or combinations thereof are used based on the precision of the transmit and/or receive beamformer for applying delays.

The transmitter for each channel is implemented with digital-to-analog converter (DAC) 8 and transmit amplifier 9. DAC 8 converts the digital samples of the transmit waveform to an analog signal. The transmit amplifier 9 sets the transmit power level and generates the high voltage pulses to drive the connected elements of the transducer array 1 for transmit beam formation. The pulse is routed to connected transducer elements through the transmit demultiplexer 3.

The receiver for each channel is implemented by the receive amplifier 12 which amplifies the signals from one element of the transducer array 1 and applies the signal to the analog-to-digital converter (ADC) 13. The connection to the element of choice is effected by the receive multiplexer 4. The ADC 13 converts each receive signal to a digital representation and the output is routed to the digital receive beamformer.

Each channel of the digital receive beamformer is implemented with filter/delay 14 and the digital demodulator 15. The filter/delay 14 provides filtering for suppression of spurious responses and delays for focusing. The digital demodulator 15 provides phasing, apodization, and rotation to baseband.

The rest of the signal processing to form receive beams is provided by digital summer 16 and receive filter 17. Summer 16 adds together similarly processed receive signals, similarly time-interleaved, from all the channels connected to other elements of the transducer array. Receive filter 17 is organized to process time-interleaved representations of the signals associated with each acquisition or receive beam, and it provides programmable receive response shaping for these signals. For the embodiment described, the output of receive filter 17 at 17α thus contains the coherent samples associated with spatially distinct receive beams.

The control functions for beam formation are schematically represented in the two central control blocks 18 and 19. In control block 18, an acquisition processor communicates with the rest of the system and provides high level control and downloading of frame parameters. A focusing processor computes the dynamic delay and apodization values required for the transmit and receive beamformers.

Control block 19 schematically illustrates the front end control function. It sets the gain and bias levels for the transmit and receive amplifiers 9 and 12. A frequency generator provides all of the necessary clocks, including sampling clocks for the ADCs 13 and the DACs 8, and clocks for other digital circuits. Control block 19 also configures the front end multiplexer 4 for synthetic aperture scanning as described in the '373 patent.

Line-dependent and range-dependent phase correction of the signal on line 17α is performed by a phase aligner R-252 shown in FIG. 3. In one embodiment, the correction data is precalculated and stored in a memory of a phase aligner controller C-270. The correction data is read out of the correction data memory in the same time-interleaved order as the data supplied by the digital receive beamformer to apply corrections to data associated with distinct receive beams. A complex multiplier R-254 phase rotates each complex sample, where each sample is represented as a complex number in which I is the real part and Q is the imaginary part. Other complex sample representations, such as RF data, may be used. For a phase adjustment of $\theta$, the real part of the output of the phase aligner R-252 is $I \cdot \cos\theta - Q \cdot \sin\theta$ and the imaginary part is $Q \cdot \cos\theta + I \cdot \sin\theta$.

The phase aligner R-252 and the controller C-270 provide for (1) scan-line-dependent and range-dependent phase adjustments of the signal required to correct for phase differences resulting from line-to-line apodization changes, scan geometry, and non-aligned effective transmit and receive origins as discussed herein, (2) remodulation (frequency alignment) of the signal to correct for phase differences resulting from different transmit frequencies per scan line (See U.S. Pat. No. 5,549,111), and (3) gain adjustment per scan line.

In operation a source data set including scan format geometry parameters, sparse scan line gain and delay values, interpolation coefficients and non-integer decimation factors are downloaded from a central control to the controller C-270. Additionally, frequency parameters used in the frequency profile generator of the central control are downloaded to the controller C-270.

The controller C-270 includes a gain and phase RAM C-280, a line interpolator C-282 which is supplied with pre-calculated and pre-stored line interpolation coefficients ($\alpha_{line}$) by the central control, and a range interpolator C-284 with a range accumulator C-286, which is supplied with a rational decimation factor L/M and a phase zone width, both of which values are pre-calculated and pre-stored in the central control. $\Delta\Phi_r$ or data used as a function of $\Delta\Phi_r$ is stored in gain phase RAM C-280. The phase differences are used to determine intermediate sums across lines such that the desired line to line phase corrections are provided. For example, $\Delta\Phi_{r1-2}$ (the difference between lines 1 and 2) is 90°, $\Delta\Phi_{r2-3}$ (the difference between lines 2 and 3) is 100°, so the stored phase values might be: $\Phi_1$ (line 1) is 0°; $\Phi_2$ (line 2) is 90°; and $\Phi_3$ (line 3) is 190°.

Alternatively, the range interpolator/extrapolator C-284 can be supplied with programmable interpolation/extrapolation coefficients which are, by way of example, either (1) pre-calculated and pre-stored in or calculated by the central control or (2) calculated locally in baseband processor control C-270 by a coefficient generator. The baseband processor control C-270 also includes a remodulation frequency processor C-292 as discussed in the '373 patent.

The phase adjustment due to scan-line-to-scan-line apodization changes, scan geometry which results in non-aligned transmit and receive origins, and the phase adjustment due to remodulating the signal to an effective common carrier frequency, if any, are added in a summer C-288 and the summed phase value is then converted in a look-up table C-290 to sine and cosine representations. As part of the function of the look-up table C-290, the gain is multiplied by the sine and cosine representations. This value is applied to the complex multiplier R-252.

Other embodiments of the baseband processor control are possible within the scope of this invention, including embodiments accounting only for the phase correction factor discussed above for simultaneous phase correction of two frequency bands whether using pre-stored values, real-time calculated values or combinations thereof.

As indicated above, the phase aligner R-252 ensures that coherent signal and sample relationships are maintained between scan lines. The transmit beams and the echo or receive samples of the signals are defined as being coherent when sufficient information is stored, preserved, or maintained to enable the samples of the return signals to be phase and amplitude corrected from scan-line-to-scan-line. The process of actually making the phase and amplitude corrections need not have yet taken place, as long as sufficient information with respect to a reference is maintained.

When a signal sample is processed coherently, the processing continues to maintain sufficient information to perform phase and amplitude correction at a later time. When two or more samples are processed coherently (e.g., coherently summed), the phase and amplitude corrections necessary for phase and amplitude alignment have preferably been previously performed.

Figure 4:
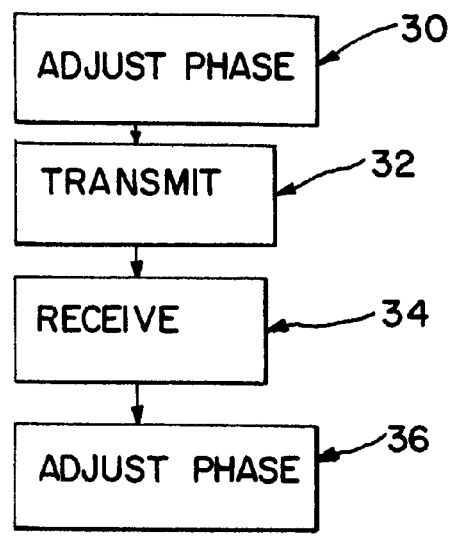
FIG. 4 is a flow chart representation of phase correction.

Referring to FIG. 4, a flow chart representing simultaneous phase correction of signal components associated with two different frequency bands is provided. The description herein of FIG. 4 includes references to FIGS. 2 and 3, but other systems may be used. The method represented by this flow chart may be used with any of various systems capable of adjusting the phase for transmit and receive beams within the scan of a region.

In step 30, the phase of waveforms for forming a transmit beam is adjusted. The adjustment is performed as a function of a phase relationship between transmit beams within the scanned region. For example, the scan geometry and diffraction determines the phase relationship between beams within a scanned region. The transmit phase correction factor, as a function of $\Delta\Phi_x$, is applied by modulator 6, delay 7 or combinations thereof to the waveforms the transmit beam. Different phase correction factors are applied for different transmit beams as a function of the relationship with other transmit beams.

In step 32, one or more wavefronts for one or more transmit beams are transmitted in one transmit event. Waveforms are transmitted to form a transmit beam responsive to various delays, phasing and apodizations applied to the waveforms from each channel in a transmit aperture. Multiple transmit beams are transmitted in different transmit events to scan a region.

In step 34, echo signals for one or more receive beams are received and converted to electrical signals. Samples representing range locations along the receive beam are generated by the receive beamformer from the electrical signals using the summer 16.

In step 36, the phase of one or more samples is adjusted. The adjustment is performed as a function of a phase relationship between receive beams within the scanned region. For example, the scan geometry and diffraction determines the phase relationship between beams within a scanned region. The receive phase correction factor, which is a function of $\Delta\Phi_r$, is applied by phase aligner R-252 or de-modulator 15, delay processors such as delay/filter 14, or combinations thereof to the samples along the receive beam. Any of these devices may correct the phase before or after beam formation. Different phase correction factors are applied for different receive beams as a function of (1) the relationship with other receive beams and (2) the transmit phase correction factors associated with the corresponding transmit beam. Using the transmit and receive correction factors for two different phase adjustments provides simultaneous phase correction for two different frequency bands.

The equations derived at (4) and associated correction factors for the fundamental and second harmonic frequency bands of the example above are derived seperately for each range and azimuth position (i.e. range and beam dependence is implicit). For dynamic transmit and receive focusing, these equations produce phase correction for ideal phase alignment at the fundamental and second harmonic center frequencies for all ranges and beams.

Ultrasound systems typically use fixed transmit focusing and dynamic receive focusing. With the fixed focus on transmit, the equations at (4) provide ideal phase alignment for both fundamental and second harmonic center frequencies substantially at one desired range across multiple beams since $\Delta\Phi_x$ is not varied dynamically.

The range for which phase corrections are ideal for both frequency bands is selected to be at a location appropriate for a given ultrasound application. For example, $\Delta\Phi_x$ is solved for at the transmit focus of interest. Other ranges, including different ranges for different beams in the same scan, may be selected.

Depth dependent phase alignment of signal components for one of the frequency bands gradually degrades as the actual receive range deviates from the selected transmit range. For example, if it is desired to have ideal phase alignment for the second harmonic for all ranges and lines/beams, then ideal phase alignment is achieved at the fundamental at a single range across the lines/beams in a given scan. However, the reduction in residual phase alignment error for the fundamental frequency signal components at other ranges is significant compared to that of a receive only phase correction.

The residual phase alignment error, $\delta\Phi$, at both fundamental and second harmonic frequencies ($\delta\Phi_1$ and $\delta\Phi_2$, respectively) is derived in the following example. For this example, the phase alignment at second harmonic frequency band is selected as being of primary importance. In alternative embodiments, the fundamental frequency band is selected as being of primary importance. The phase shift of signal components at the fundamental frequency band is related to the phase shift of signal components at the second harmonic frequency band by $\Delta\Phi_1 \sim (f_1/f_2) \Delta\Phi_2$, and $r_0$ is the range selected to evaluate the beam to beam transmit phase correction (i.e., $\Delta\Phi_x(r_0)$).

The residual errors for phase correction based only on dynamic receive focusing are represented by equation group (5) as follows:

$$\delta\phi_1 = \Delta\phi_1 + \Delta\phi_r \qquad \delta\phi_2 = \Delta\phi_2 + \Delta\phi_r$$

$$\delta\phi_1 = \Delta\phi_1 + \Delta\phi_{2c} = \Delta\phi_1 - \Delta\phi_2 \qquad \delta\phi_2 = \Delta\phi_2 + \Delta\phi_{2c} = \Delta\phi_2 - \Delta\phi_2$$

$$\delta\phi_1 \sim (f_1/f_2 - 1)\Delta\phi_2 \qquad \delta\phi_2 = 0$$

The residual errors for simultaneous fixed focus transmit and dynamic receive phase correction are represented by equation group (6) as follows:

$$\delta\phi_1 = \Delta\phi_1 + \Delta\phi_x(r_0) + \Delta\phi_r \qquad \delta\phi_2 = \Delta\phi_2 + 2\Delta\phi_x(r_0) + \Delta\phi_r$$

$$\delta\phi_1 = \Delta\phi_1 + \Delta\phi_{2c} - \Delta\phi_x(r_0) \qquad \delta\phi_2 = \Delta\phi_2 + 2\Delta\phi_x(r_0) + \Delta\phi_{2c} - 2\Delta\phi_x(r_0)$$

$$\delta\phi_1 = \Delta\phi_1 + \Delta\phi_{2c} - [\Delta\phi_{2c}(r_0) - \Delta\phi_{1c}(r_0)] \qquad \delta\phi_2 = \Delta\phi_2 + \Delta\phi_{2c} = \Delta\phi_2 - \Delta\phi_2$$

-continued $$\delta\phi_1 = [\Delta\phi_1 - \Delta\phi_1(r_0)] - [\Delta\phi_2 - \Delta\phi_2(r_0)]$$

$$\delta\phi_1 \sim (f_1/f_2 - 1)[\Delta\phi_2 - \Delta\phi_2(r_0)] \qquad \delta\phi_2 = 0$$

The residual phase error of signal components at the second harmonic center frequency, $f_2$, is substantially zero for all ranges and lines/beams. The residual phase error of signal components at the fundamental center frequency $f_1$ is substantially zero for all lines/beams at range $r_0$ and non-zero away from range $r_0$. Away from range $r_0$, the residual phase error is reduced where the transmit phase adjustments are used. The $[\Delta\Phi_2 - \Delta\Phi_2(r_0)]$ factor of the residual phase shift using both transmit and receive processing is smaller than the corresponding factor $\Delta\Phi_2$ of the residual phase shift using only receive phase shift processing.

The equations of group (6) were derived assuming a fundamental center frequency $f_1$ and a second harmonic center frequency $f_2$. The residual phase error associated with a fixed focus transmit system may be calculated for (1) the fundamental and other harmonic center frequencies or (2) two harmonic signal components of different orders. Primary importance may be placed on either frequency band, setting the corresponding residual phase errors for all ranges to substantially zero.

The equations of group (6) were also derived so that the second harmonic residual phase error for all ranges and beams is substantially zero. In alternative embodiments, residual phase errors are distributed across signal components of both frequency bands, such as in a arbitrary weighted fashion. Either one or both right sides of the equations of group (2) are set to non-zero values and solved for $\Delta\Phi_x$ and $\Delta\Phi_r$ accordingly. The residual phase errors may also be varied as a function of position within the scan, such as placing primary importance on signal components at one frequency band for one scan line and on another frequency band for a different scan line and/or as a function of different depths.

The phase corrections discussed herein may be used with one or more of various transmit and receive processes. For example, multiple receive beams are received in the same reception event, such as disclosed in U.S. Pat. No. 5,685,308. Phase correction values for each receive beam are determined separately. Likewise, transmitting multiple transmit beams in the same transmit event may also be used, such as disclosed in U.S. Pat. No. 5,675,554. Phase corrections for each transmit beam are determined separately (i.e. each of the multiple beams is treated as an individual transmit beam). Compound or zone focusing may also be used.

Another transmit process that may be used is alternate line phasing as disclosed in U.S. application Ser. No. 09/198,219, filed Nov. 23, 1998. See also U.S. application Ser. No. 09/282,396 (Attorney Ref. No. 5050/542), filed herewith. Spatially separate transmit beams are fired with alternating phase between beams along the azimuth and/or elevation dimensions. Phasing that accounts for the phase alignment as discussed herein and any additional alternating phase is applied to the transmit beams.

Yet another technique that may be used with the simultaneous phase correction discussed herein is pulse inversion, such as disclosed in U.S. Pat. Nos. 5,706,819 by Hwang et al. or 5,632,277 by Chapman et al. Generally, two or more beams with different phasing are sequentially transmitted along the same scan line. The phasing or inversion for beams on different scan lines may be the same or alternated as a function of the scan line. Phasing that accounts for the phase alignment as discussed herein and any additional phasing for pulse inversion is applied to the transmit beams. Other techniques involving phase and/or delay changes as a function of range and/or azimuth position may be used.

The signal components corresponding to each frequency band may be used for any one or more of various ultrasound processes. For example, an image with two different regions responsive to signal components at the fundamental and second harmonic frequency bands, respectively, is generated. The different frequency band signal components may be combined. One component may be used for one process, such as aberation correction, and another for another process, such as imaging.

Simultaneous phase correction of two different frequency bands may be useful for different types of imaging. For example, contrast agents are injected into the target. The received samples are responsive, in part, to the contrast agents. Signal components at one frequency band may respond to the contrast agents differently than signal components at another frequency band. Likewise, signal components at one frequency band may respond to tissue in the absence of contrast agents differently than signal components at another frequency band. A target may be kept free of added contrast agents during an entire imaging session.

While the invention has been described above by reference to various embodiments, it will be understood that many changes and modifications can be made without departing from the scope of the invention. For example, coherency may be obtained using different hardware that requires phase adjustments, delay adjustments or combinations thereof. Hardware limitations may result in non-ideal application of simultaneous phase correction of two different frequency bands, but still benefit from one or more advantages of this methodology.

It is therefore intended that the foregoing detailed description be understood as an illustration of the presently preferred embodiments of the invention, and not as a definition of the invention. It is only the following claims, including all equivalents, that are intended to define the scope of this invention.

What is claimed is:

1. A medical diagnostic ultrasound method for phase correction of signal components, the method comprising the steps of:

(a) adjusting a first phase of a first transmit beam by a first correction factor as a function of a phase relationship between the first transmit beam and a second transmit beam; and (b) adjusting a second phase of data representing at least part of a first receive beam by a second correction factor, the first receive beam responsive to the first transmit beam.

2. The method of claim 1 further comprising:

(c) selecting the first correction factor as a function of the second correction factor.

3. (amended) The method of claim 2 further comprising:

(d) transmitting the first and the second transmit beam;

wherein:

the first correction factor is a function of a first phase error at a first frequency and a second phase error at a second frequency, the first and second phase errors comprising errors between the first and second transmit beams; and the second correction factor is a function of the first phase error and the first correction factor.

4. The method of claim 3 wherein:

the first correction factor is a function of the second phase error at a fundamental frequency subtracted from the first phase error at a harmonic frequency; and the second correction factor is a function of two times the first correction factor subtracted from the first phase error at the harmonic frequency.

5. The method of claim 1 wherein steps (a) and (b) comprise:

(c) simultaneously adjusting phases between samples for harmonic and fundamental frequency bands.

6. The method of claim 5 wherein step (c) comprises adjusting for harmonic and fundamental frequency bands, the harmonic frequency band comprising a second harmonic frequency band.

7. The method of claim 1 wherein steps (a) and (b) comprise:

(c) simultaneously adjusting phases between samples for two different harmonic frequency bands.

8. The method of claim 1 further comprising performing steps (a) and (b) for a scan of a region, wherein the first and second correction factors are a function of a spatial position of the first transmit beam and the first receive beam.

9. The method of claim 1 further comprising performing steps (a) and (b) for a scan of a region, wherein the second correction factor varies as a function of range.

10. The method of claim 1 further comprising:

(c) transmitting the first transmit beam with a fixed focus; and (d) dynamically adjusting the focus of the first receive beams;

wherein the first correction factor is responsive to the fixed focus; and wherein the second correction factor varies as a function of depth.

11. The method of claim 10 further comprising:

(e) selecting residual phase errors associated with first and second frequency bands as a function of step (d).

12. The method of claim 11 further comprising:

(f) more accurately phase aligning samples at a first frequency band than at a second frequency band as a function of step (e).

13. The method of claim 1 wherein adjusting at least one of the first and second phases of steps (a) and (b) comprises adjusting selected from the group consisting of: a phase, a delay and combinations thereof.

14. (amended) The method of claim 1 wherein:

the second correction factor is a function of a phase relationship between the first and a second receive beams.

15. A medical diagnostic ultrasound system for phase correction of signal components, the system comprising:

a transmit beamformer for adjusting a first phase relationship between at least first and second transmit beams by a first correction factor; and a receive beamformer for adjusting a second phase relationship between data representing at least first and second received beams by a second correction factor, the at least first and second received beams responsive to the at least first and second transmit beams, respectively.

16. The system of claim 15 further comprising a controller for selecting the first correction factor as a function of the second correction factor.

17. The system of claim 15 wherein the transmit and receive beamformers are operable to simultaneously adjust a phase relationship between samples for harmonic and fundamental frequency bands.

18. In a medical diagnostic ultrasound method comprising the steps of (a) transmitting at least two transmit beams, (b) receiving samples along at least two receive beams responsive to the at least two transmit beams, and (c) establishing a coherent relationship between at least two of the samples, each of the at least two samples associated with a different one of the at least two receive beams, an improvement wherein step (c) comprises the step of:

(c1) simultaneously adjusting a phase between the at least two of the samples for harmonic and fundamental frequency bands.

19. The method of claim 18 wherein step (c1) comprises:

adjusting a first phase relationship between at least first and second transmit beams by a first correction factor; and adjusting a second phase relationship between data representing at least first and second received beams by a second correction factor, the at least first and second received beams responsive to the at least first and second transmit beams, respectively.

* * * * *

UNITED STATES PATENT AND TRADEMARK OFFICE
CERTIFICATE OF CORRECTION

PATENT NO. : 6,168,565 B1
DATED : January 2, 2001
INVENTOR(S) : David J. Napolitano It is certified that error appears in the above-identified patent and that said Letters Patent is hereby corrected as shown below:

<u>Column 2,</u>
Line 24, delete "MENTION" and substitute -- INVENTION -- in its place.

<u>Column 3,</u>
Line 18, delete "$\Delta \Phi_2 = 2\pi f_2 \Delta\tau = 2\pi 2/f_2/f_2 = 2\pi$" and substitute -- $\Delta \Phi_2 = 2\pi f_2 \Delta\tau = 2\pi f_2/f_2 = 2\pi$ -- in its place.

Signed and Sealed this

Twelfth Day of March, 2002

Attest:

*Attesting Officer*

JAMES E. ROGAN
*Director of the United States Patent and Trademark Office*